United States Patent [19]

Corrales

[11] Patent Number: 4,905,030
[45] Date of Patent: Feb. 27, 1990

[54] MANUALLY OPERATED HANDLE FOR PANORAMIC CAMERAS

[76] Inventor: Richard C. Corrales, 7355 College Ave., Whittier, Calif. 90602

[21] Appl. No.: 308,052

[22] Filed: Feb. 9, 1989

[51] Int. Cl.⁴ .............................................. G03B 29/00
[52] U.S. Cl. ...................................... 354/82; 354/94; 354/293
[58] Field of Search ........................ 354/81, 82, 94–98, 354/293, 295; 352/69, 243

[56] References Cited

U.S. PATENT DOCUMENTS

| 369,165 | 8/1887 | Connon | 354/99 |
| 3,230,850 | 1/1969 | Campbell | 354/99 |
| 4,241,985 | 12/1980 | Globus et al. | 354/99 |

Primary Examiner—L. T. Hix
Assistant Examiner—Brian W. Brown
Attorney, Agent, or Firm—Edgar W. Averill, Jr.

[57] ABSTRACT

A manually operated handle for panoramic cameras. The handle has a shaft which extends upwardly for contact with a panoramic camera. The shaft is caused to rotate by the moving of a rack along the side of the handle. A pair of one-way clutches causes the shaft to move only in one direction.

7 Claims, 1 Drawing Sheet

U.S. Patent
Feb. 27, 1990
4,905,030
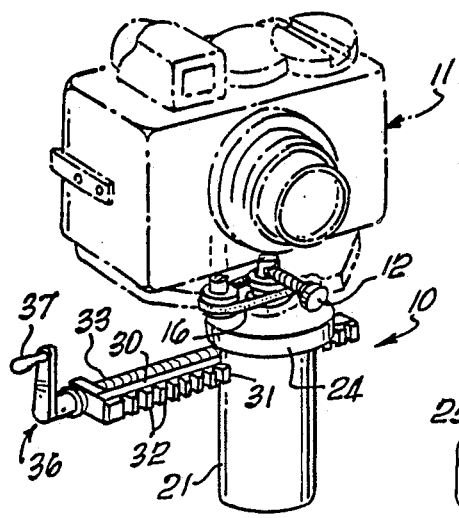
Fig. 1.
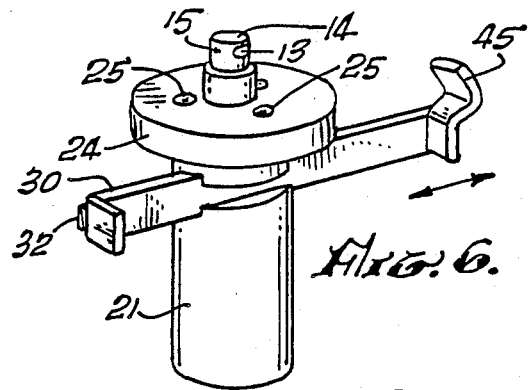
Fig. 6.
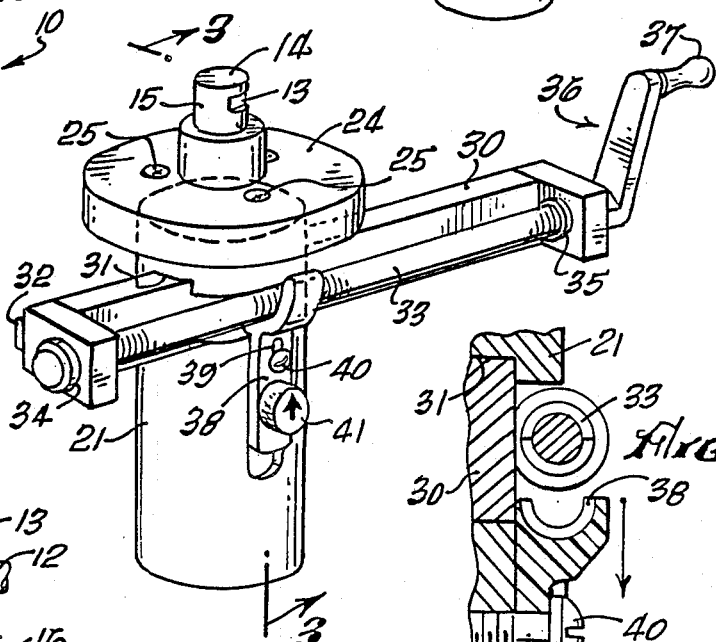
Fig. 2.
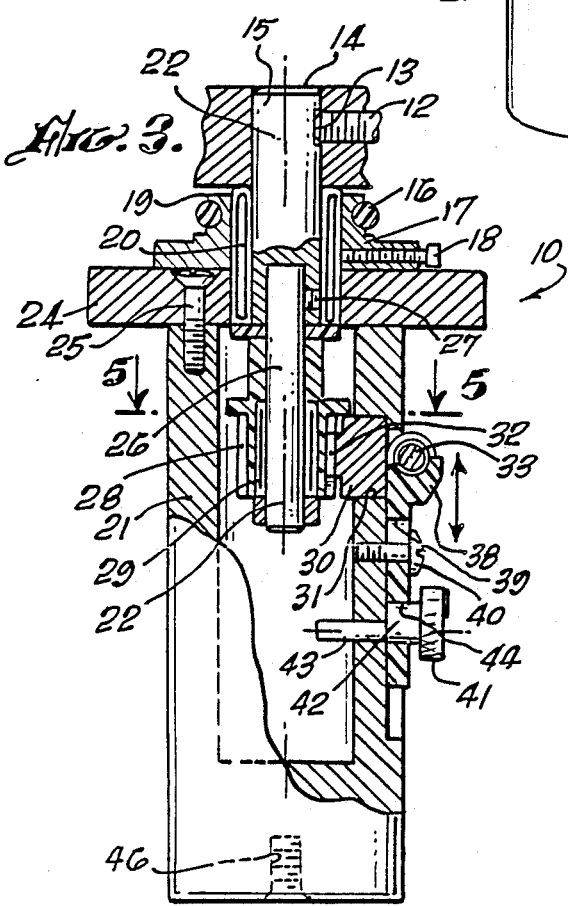
Fig. 3.
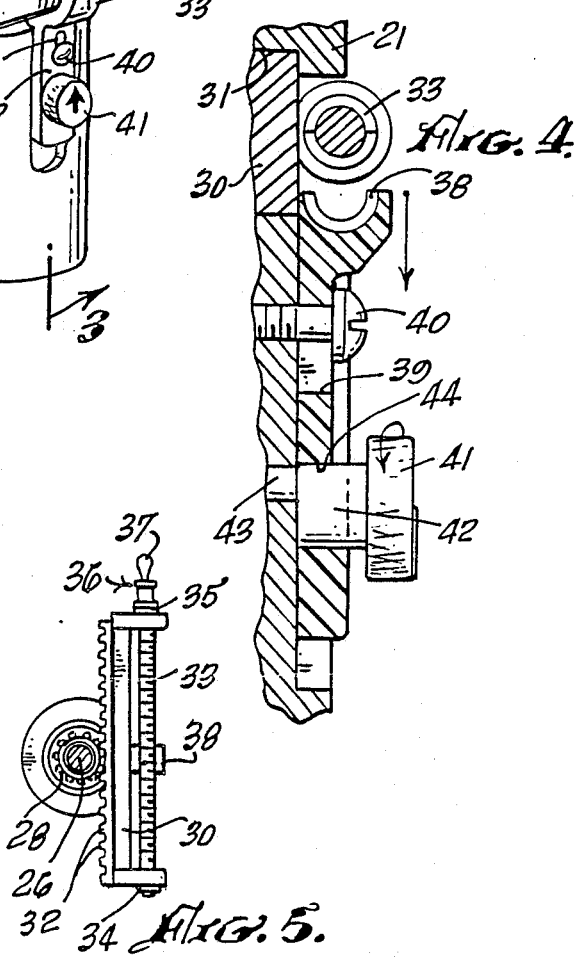
Fig. 4.
Fig. 5.

MANUALLY OPERATED HANDLE FOR PANORAMIC CAMERAS

CROSS-REFERENCE TO RELATED APPLICATIONS

The handle of the present invention is useful with the panoramic camera shown in applicant's pending patent application, Ser. No. 243,517, filed Sept. 12, 1988, U.S. Pat. No. 4,864,335.

BACKGROUND OF THE INVENTION

The field of the invention is photography, and the invention relates more particularly to panoramic cameras of the type useful for taking a picture while being rotated. One such camera is shown in applicant's co-pending patent application, Serial No. 243,517, filed Sept. 12, 1988. Such application discloses a handle which has a shaft connectable to the camera, which shaft is operated by a battery-driven motor. Such handle is useful for many applications, but has the inherent shortcomings of any battery-operated device, namely, the imperfect movement when the battery is about dissipated.

SUMMARY OF THE INVENTION

It is an object of the present invention to provide a manually operated handle for panoramic cameras.

The present invention is for a manually operated handle for panoramic cameras comprising a handle body having a central opening, which body has a vertical axis. A rotatable, central shaft is held by the handle body, and the axis of the shaft is parallel to the vertical axis of the handle body. An upper portion of the shaft is affixable to a panoramic camera, and the central shaft also has a lower portion. Gear means are affixed to the lower portion of the central shaft and a first one-way clutch contacts the lower portion of the central shaft and is located between the gear means and the upper portion of the central shaft. This first one-way clutch permits the gear means to turn in a first direction to turn the upper portion of the central shaft and to turn in a direction opposite to the first direction freely without turning the upper portion of the central shaft. Rack means are slidably held by the handle body, and the rack means have teeth which mesh with the gear means. The rack means is mounted at a right angle with respect to the central axis of the central shaft. A second one-way clutch is held by the handle body and contacts the upper portion of the central shaft and permits it to turn only in a first direction. The rack may be moved by a trigger affixed thereto or by the turning of a worm gear rotatably held by the rack assembly. When a worm gear is used, preferalby a slidable nut may be moved in and out of contact with the worm gear to permit the resetting of the rack.

BRIEF DESCRIPTION OF THE DRAWINGS

FIG. 1 is a perspective view of the manually operated handle of the present invention showing a panoramic camera in phantom view.

FIG. 2 is an enlarged perspective view of the manually operated handle of FIG. 1.

FIG. 3 is an enlarged cross-sectional view taken along line 3—3 of FIG. 2.

FIG. 4 is an enlarged cross-sectional view of the worm gear and slidably nut of the panoramic camera of FIG. 1.

FIG. 5 is a cross-sectional view taken along line 5—5 of FIG. 3.

FIG. 6 is a perspective view of an alternate embodiment of the manually operated handle assembly of FIG. 1.

DESCRIPTION OF THE PREFERRED EMBODIMENTS

The manually operated handle assembly of the present invention is shown in perspective view in FIG. 1 and indicated by reference character 10. A panoramic camera 1 is shown in phantom view and is of the type described in applicant's co-pending application referencee above. The camera 11 is held to the shaft by a thumb screw 12 threaded into platform 23. Thumb screw 12 is shown in FIG. 3 and abuts a flat 13 in the upper portion 14 of shaft 15. A drive belt 16 passes over a handle pulley 17 which is affixed by a thumb screw 18 to a collar 19. Collar 19 is held by disk 24 which, in turn, is held by screws 25 onto handle body 21. Collar 19 contains a one-way clutch 20 between the handle body 21 and the upper portion 14 of shaft 15. It is important that the camera 11 not be permitted to rotate in a reverse direction but only in a forward direction. The turning of camera 11 in a reverse direction could re-expose a portion of the already exposed film. Handle body 21 includes a threaded opening 46 for attachment of a tripod in a conventional manner.

Shaft 15 has a central axis 22 about which it rotates. Shaft 15 has a lower portion 26 which has the same central axis 22 as the upper portion 14. A set screw 27 holds the upper portion 14 to the lower portion 26. A gear 28 contacts the lower portion 26 of shaft 15 through a one-way clutch 29. One-way clutch 29 permits gear 28 to rotate shaft 15 when it is turned in a first direction, but to turn freely with respect to shaft 15 when it is rotated in a direction opposite to the first direction. It should be noted that although one-way clutch 29 is shown between gear 28 and the lower portion 26 of shaft 15, it could, instead, be positioned between lower portion 26 and upper portion 14.

A rack 30 is slidably held in a generally rectangular opening 31. Rack 30 has a plurality of teeth 32 which cause gear 28 to turn as rack 30 slides along the generally rectangular opening 31. A worm gear 33 is mounted on rack 30 by a bearing 34 affixed to worm gear 33 at one end, and a bearing 35 affixed at the handle end. A handle 36 has a knob 37 which facilitates the turning of worm gear 33. A slidable nut 38, shown best in FIG. 4, may be moved into contact (as shown in FIG. 3) or out of contact (as shown in FIG. 4) with worm gear 33. Slidable nut 38 has a slot 39 which allows it to be slidably held to handle body 21 by screw 40. A knob 41 may be turned to move slidable nut 38 up and down by way of a cam 42 held on a central shaft 43 which, in turn, is held by handle body 21 as shown best in FIG. 3. Cam 42 contacts a cam follower 44 which comprises an opening in slidable nut 38.

In operation, the slidable nut 38 is moved to a downward position, as shown in FIG. 4, and rack 30 is moved in the direction of handle 36. One-way clutch 29 permits gear 28 to turn freely with respect to lower portion 26 of shaft 15. Next, knob 41 is turned to move slidable nut 38 at the contact with worm gear 33. Camera 11 is then set to take a panoramic picture, and knob 37 is turned, thereby turning worm gear 33 which, because it is contacting nut 38, moves rack 30 with respect to handle body 21. This causes gear 28 to turn shaft 15. One-way clutch 20 permits the turning of shaft 15 in this direction, and the picture is obtained. When another picture is desired, knob 41 is again turned to move slidable nut 38 out of contact with worm gear 33. Slidable nut 38 subtends less than 180° around worm gear 33.

A simpler configuration is shown in FIG. 6 where rack 30 does not support a worm gear but, instead, has only a trigger 45 which can be manually squeezed toward handle body 21 causing the shaft 15 to turn as described below. It is, of course, also possible to combine the two configurations and to include a trigger 45 adjacent handle 36 so that it may be operated either through worm gear 33 or directly by trigger 45.

The manually operated handle of the present invention provides an exceptionally reliable method of turning a panoramic camera. It does not rely upon a battery or motor or switch but, instead, is always ready for use even in temperature extremes.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A manually operated handle for panoramic cameras comprising:
    a handle body having a central opening, said handle body having a vertical axis;
    a rotatable central shaft held by said handle body, said central shaft having a central axis parallel with the vertical axis of said handle body, said central shaft having an upper portion affixable to a panoramic camera and said central shaft having a lower portion;
    gear means affixed to the lower portion of said central shaft, said gear means having an axis of rotation at said central axis of said central shaft;
    a first one-way clutch means contacting the lower portion of said central shaft, said first one-way clutch means being located between said gear means and the upper portion of said central shaft, said one-way clutch means permitting said gear means to turn in a first direction to turn the upper portion of said central shaft and to turn in a direction opposite to said first direction freely without turning the upper portion of said central shaft;
    rack means slidably held by said handle body, said rack means having teeth which mesh with said gear means and said rack means being mounted at a right angle with respect to the central axis of said central shaft;
    a second one-way clutch held by said handle body, said second one-way clutch contacting the upper portion of said central shaft and permitting it to turn only in a first direction, whereby when said rack means is moved in a first direction, said gear means turns said central shaft in a first direction and said second one-way clutch permits such turning, but when said rack means is moved in a direction opposite to said first direction, said first one-way clutch means permits the gear means to turn freely with respect to the upper portion of said central shaft and said second one-way clutch prevents any turning of the upper portion of said central shaft in a direction opposite to said first direction.

2. The manually operated handle of claim 1 wherein said rack means further includes a trigger at one end thereof so that the central shaft may be turned by squeezing the trigger and moving it towards the handle body.

3. The manually operated handle of claim 1 further including a worm gear rotatably affixed to said rack means, said worm gear having a handle at one end thereof and nut means affixed to said handle body whereby when said worm gear is turned by its handle, said rack means moves with respect to said handle body.

4. The manually operated handle of claim 3 wherein said nut means is movable between a first position in which it contacts said worm gear and a second position where it does not contact said worm gear so that said worm gear can be easily moved when said nut means is not contacting said worm gear.

5. The manually operated handle of claim 4 wherein said nut means subtends less than 180° around said worm gear and said nut means is vertically slidable in and out of contact with said worm gear.

6. The manually operated handle of claim 5 wherein said nut means is moved vertically by a rotatable cam held by said handle body and said nut means has a cam contacting surface thereon.

7. A manually operated handle for panoramic cameras comprising:
    a handle body having a central opening, said handle body having a vertical axis;
    a central shaft held by said handle body, said central shaft having a central axis parallel with the vertical axis of said handle body, said central shaft having an upper portion affixable to a panoramic camera and said central shaft being rotatable;
    gear means affixed to said central shaft, said gear means having an axis of rotation at said central axis of said central shaft, said gear means being connected to said central shaft by a first one-way clutch which causes said central shaft to turn with said gear means when said gear means is turned in a first direction and permits said gear means to turn freely when said gear means is turned in the direction opposite ot said first direction;
    rack means slidably held by said handle body, said rack means having teeth which mesh with said gear means and said rack means being mounted at a right angle with respect to the central axis of said central shaft;
    a second one-way clutch held by said handle body, said second one-way clutch contacting said central shaft and permitting it to turn only in a first direction, whereby when said rack means is moved in a first direction, said gear means turns said central shaft in a first direction and said second one-way clutch permits such turning, but when said rack means is moved in a direction opposite to said first direction, said first one-way clutch permits the gear means to turn freely with respect to said central shaft and said second one-way clutch prevents any turning of said central shaft in a direction opposite to said first direction.

* * * * *